J. SCHNEIBLE.
GAGING AND MEASURING APPARATUS FOR LIQUIDS.
APPLICATION FILED JUNE 12, 1911.
1,007,393.
Patented Oct. 31, 1911.
2 SHEETS—SHEET 1.
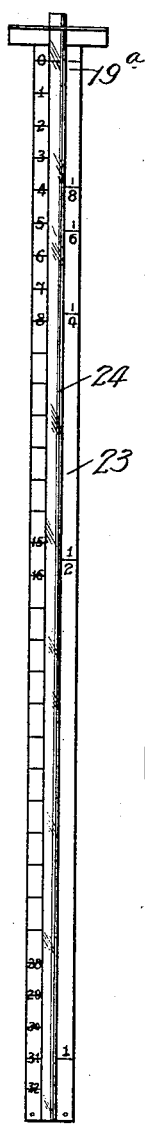
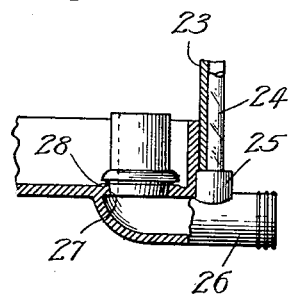
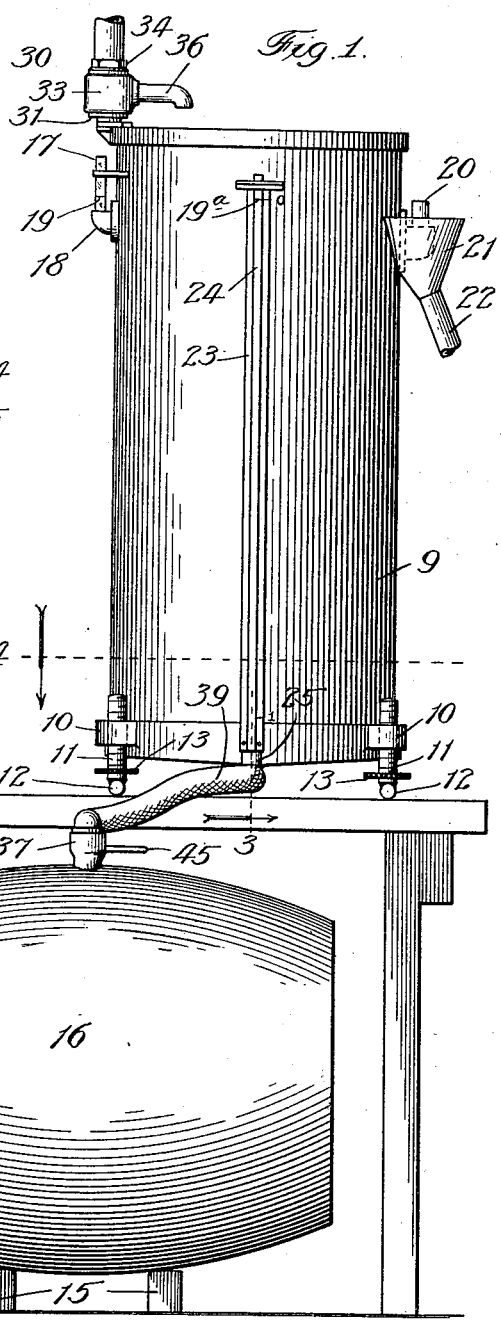
Witnesses:
Inventor:
Joseph Schneible
By Dyrenforth, Lee, Chritton & Wiles
Attys.

J. SCHNEIBLE.
GAGING AND MEASURING APPARATUS FOR LIQUIDS.
APPLICATION FILED JUNE 12, 1911.
1,007,393.
Patented Oct. 31, 1911.
2 SHEETS—SHEET 2.
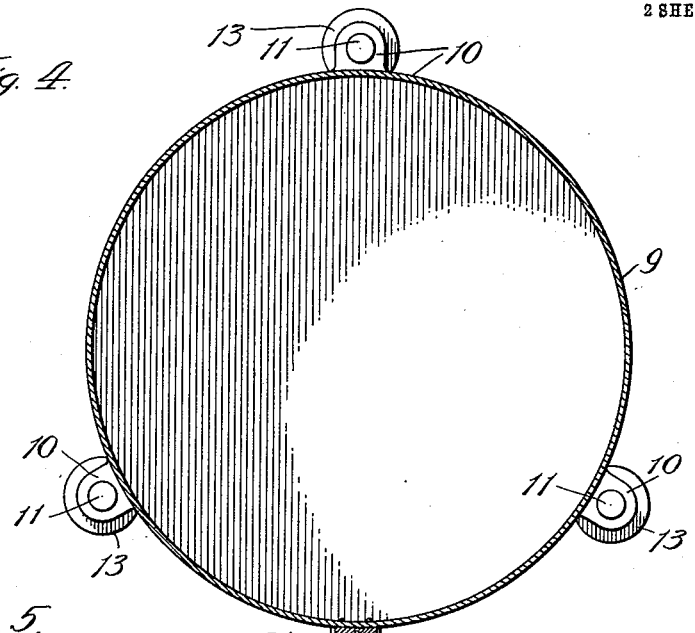
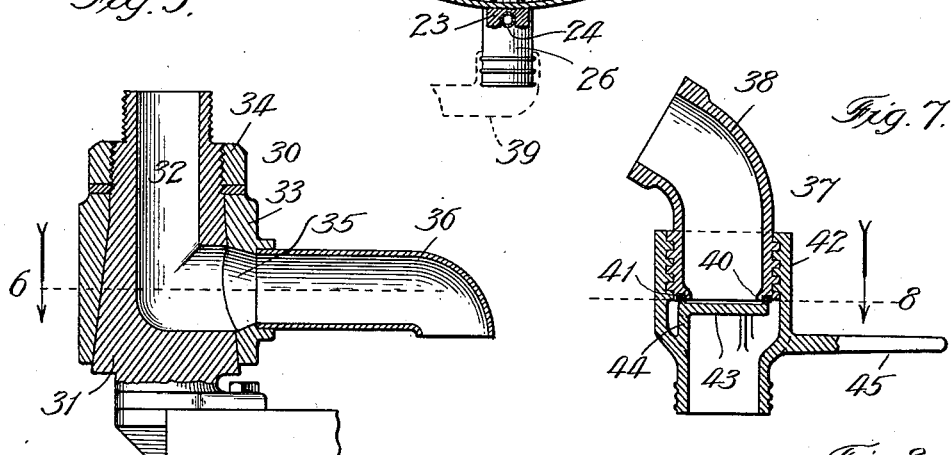
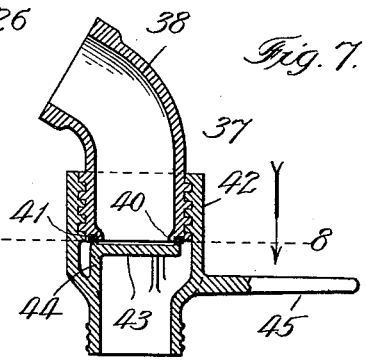
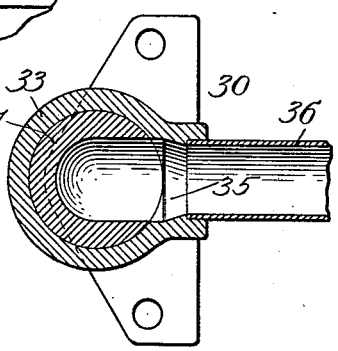
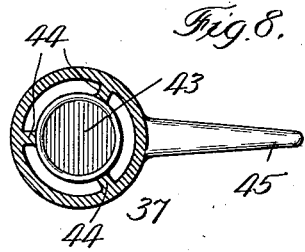

UNITED STATES PATENT OFFICE.

JOSEPH SCHNEIBLE, OF CHICAGO, ILLINOIS.

GAGING AND MEASURING APPARATUS FOR LIQUIDS.

1,007,393.  Specification of Letters Patent.  Patented Oct. 31, 1911.

Application filed June 12, 1911. Serial No. 632,739.

*To all whom it may concern:*

Be it known that I, JOSEPH SCHNEIBLE, a citizen of the United States, residing at Chicago, in the county of Cook and State of Illinois, have invented a new and useful Improvement in Gaging and Measuring Apparatus for Liquids, of which the following is a specification.

My invention relates to an improvement in measuring apparatus for testing the capacity of barrels and analogous receptacles for liquids; and it consists in the features of construction hereinafter described and pointed out in the claims.

In the accompanying drawings, Figure 1 shows my improved apparatus by a view in elevation in operative connection with a barrel to be tested; Fig. 2 is an enlarged view of the gage-tube; Fig. 3 is an enlarged broken section on line 3, Fig. 1, showing a thimble adjunct; Fig. 4 is an enlarged section on line 4, Fig. 1; Fig. 5 is an enlarged view in vertical sectional elevation of the valved spout used on the upper end of the gage-tank for filling it; Fig. 6 is a section on line 6, Fig. 5; Fig. 7 is a view in sectional elevation of a valve-device for connecting the gaging apparatus with a barrel at its bung-hole, and Fig. 8 is a section on line 8, Fig. 7.

The tank 9, which may be of the usual form illustrated, has ears 10, of which three are shown, extending equidistantly apart outwardly about its lower headed end to form bearings for threaded supporting-legs 11 carrying feet 12 on their lower ends and hand-wheels 13 for turning the legs in their bearings to adjust the level of the tank on a floor, or platform 14, below which is shown a seat 15 for a barrel 16 to be tested. A sight-glass 17, for assisting in the leveling purpose hereinafter explained, is supported in the upwardly projecting end of a short elbow 18 leading laterally out of the tank near its upper end. On this sight-glass is provided a level-indicating line at 19 in the same horizontal plane with the upper end of an overflow-spout 20 extending from the tank diametrically opposite the sight-glass in a funnel 21 on the outer tank-wall and having a spout 22 leading from it for the discharge of overflow. Between the sight-glass and overflow-spout is supported a gage-indicating back 23, secured to the tank to extend vertically from near its upper open end partway over the head forming the tank-bottom, a gage-tube 24 seated in a nipple 25 projecting upwardly from a spout 26 at a discharge-opening 27 in the bottom of the tank and formed with a seat 28 for a circumferentially-flanged thimble 29 serving the purpose hereinafter explained. On the tube 24, near its upper end, is provided a level-indicating line $19^a$ in the same horizontal plane with the line 19 and upper end of the overflow-spout 20; and the line $19^a$ registers with the zero-notation on the back 23, which marks the level to which the tank must be filled with water to equal in quantity the required capacity of a barrel 16 to be tested. The scale shown on the back 23 is in numbers from 0 to 32, denoting gallons; and the notations 1/8, 1/6, 1/4, 1/2 thereon denote the respective fractions of a barrel, while the numeral 1, in line with the number 31 thereon, denotes a whole barrel.

For filling the tank with its supply of water, it has secured upon its upper end a faucet 30 of the preferred construction illustrated in Fig. 5. This faucet comprises an upwardly-tapering plug 31 rigidly secured in position on the tank and containing an L-shaped passage 32 with which to couple, about its upper threaded end, a flexible pipe or hose (not shown) for leading to it a supply of water. About the plug seats rotatably a closely-fitting casing 33, secured by a nut 34 and containing a port 35 from which extends a spout 36 affording a handle by which to turn the casing for closing and opening the valve by taking the port out of and into registration with the outlet-end of the passage 32.

A suitable valve-device 37 for controllably filling a barrel 16 through its bung-hole from the tank 9, is shown in detail in Figs. 7 and 8. It comprises a nipple 38 for connection with the nipple 26 by a flexible pipe or hose 39 and threaded about its lower end, the extremity of which forms a seat 40 provided with a packing-ring 41; a nozzle 42, screwing upon the nipple and containing a central disk-stopper 43 spaced from the inner wall of the nozzle by ribs 44 forming passages for the flow, and a handle 45 on the nozzle by which to turn it on the thread of the nipple and thereby raise and lower the stopper 43 relatively to the seat 40 for closing and opening the valve-device. The lower reduced end of the nozzle 42 is shown to be externally threaded to adapt it to be screwed into the bung-hole of a barrel.

To use my improved apparatus for ascertaining the capacity of a barrel 16, it is connected therewith by the valve-device 37, with the latter closed, the tank being on the platform 14 in the position relative to the barrel represented in Fig. 1. The faucet 30 is then opened to fill the tank with water to the level defined by the lines 19 and 19ª, and if the tank be perfectly level the quantity of water thus filled into it will measure a predetermined quantity, as one gallon, in excess of thirty-one gallons, as the capacity of a standard barrel. In this measurement is included the quantity in the hose 39, which renders important the provision of the valve-device 37 on its discharge-end since otherwise there would be flow into the barrel from the hose after closing the valve-device. If the tank is not level, inaccuracy in its measuring function will ensue, and must be obviated by properly leveling it. The lines 19 and 19ª will indicate any imperfection in the water-level within the tank, which may be readily corrected by properly turning one or more of the screw-legs 11. With the tank thus filled with water to the proper level, and the faucet 30 closed, the valve-device 37 is opened to permit the contents of the tank to flow into the barrel. The gage will then indicate whether the capacity of the barrel be the required number of gallons, or more or less than that quantity.

The thimble 29 is only used when the apparatus is employed as a measuring device to measure the capacity of a receptacle any number of times that of the tank 9. The flow from the tank then takes place through the thimble and cuts off the quantity of water in the bottom of the tank about the thimble up to its upper end. The height of the thimble is so proportioned as to thus cut off from flowing out of the tank the exact quantity, in excess of that corresponding with the predetermined barrel-measurement, of the liquid to be filled into the aforesaid receptacle by each operation of the apparatus.

What I claim as new and desire to secure by Letters Patent is—

1. In an apparatus of the character described, the combination of a tank provided with a valved discharge-outlet, means on the base-portion of the tank for adjusting it to level its bottom relative to a platform supporting the tank, a gage-tube on the tank provided with water-level-indicating means at the pre-determined water-level in the tank, and an overflow-spout on the tank registering at its upper end with said water-level, said gage-tube and overflow being spaced apart on the tank to coöperate in forming a guide for the adjustment of said leveling means.

2. In an apparatus of the character described, the combination of a tank provided with a valved discharge-outlet, means in the base-portion of the tank for adjusting it to level its bottom relative to a platform supporting the tank, a gage-tube and a sight-glass on the tank provided with corresponding water-level-indicating means at the pre-determined water-level in the tank, and an overflow-spout on the tank registering at its upper end with said water-level, said gage-tube, sight-glass and overflow being spaced apart on the tank to coöperate in forming a guide for the adjustment of said leveling means.

3. In an apparatus of the character described, the combination of a tank provided with a valved discharge-outlet, means on the base-portion of the tank for adjusting it to level its bottom relative to a platform supporting the tank, a gage-tube and a sight-glass on the tank provided with corresponding water-level-indicating means at the predetermined water-level in the tank and forming a guide for the adjustment of said leveling means, an overflow-spout on the tank registering at its upper end with said water-level, and a funnel on the tank provided with a discharge-pipe for the overflow.

JOSEPH SCHNEIBLE.

In the presence of—
WILLIAM T. JONES,
RALPH SCHAEFER.

---

Copies of this patent may be obtained for five cents each, by addressing the "Commissioner of Patents, Washington, D. C."